(12) United States Patent
Zheng

(10) Patent No.: US 9,976,081 B2
(45) Date of Patent: May 22, 2018

(54) POLYMER-STABILIZED DUAL FREQUENCY BLUE PHASE LIQUID CRYSTALS

(71) Applicant: EAST CHINA UNIVERSITY OF SCIENCE AND TECHNOLOGY, Shanghai (CN)

(72) Inventor: Zhigang Zheng, Shanghai (CN)

(73) Assignee: EAST CHINA UNIVERSITY OF SCIENCE AND TECHNOLOGY, Shanghai (CN)

( * ) Notice: Subject to any disclaimer, the term of this patent is extended or adjusted under 35 U.S.C. 154(b) by 0 days. days.

(21) Appl. No.: 14/787,589

(22) PCT Filed: Apr. 28, 2013

(86) PCT No.: PCT/CN2013/074924
§ 371 (c)(1),
(2) Date: Oct. 28, 2015

(87) PCT Pub. No.: WO2014/176717
PCT Pub. Date: Nov. 6, 2014

(65) Prior Publication Data
US 2016/0083652 A1    Mar. 24, 2016

(51) Int. Cl.
*G02F 1/1333*    (2006.01)
*C09K 19/02*    (2006.01)
*C09K 19/58*    (2006.01)
*G02F 1/137*    (2006.01)
*C09K 19/54*    (2006.01)

(52) U.S. Cl.
CPC ........ *C09K 19/0275* (2013.01); *C09K 19/542* (2013.01); *C09K 19/586* (2013.01); *C09K 19/588* (2013.01); *G02F 1/137* (2013.01); *C09K 2019/548* (2013.01); *G02F 2001/13775* (2013.01); *G02F 2001/13793* (2013.01)

(58) Field of Classification Search
CPC .......... C09K 19/0275; C09K 19/586; C09K 19/588; C09K 19/542; C09K 2019/548; G02F 1/1333; G02F 1/137; G02F 2001/13775; G02F 2001/13793
USPC .......... 252/299.5, 299.01; 349/183
See application file for complete search history.

(56) References Cited

U.S. PATENT DOCUMENTS

| 5,621,552 A * | 4/1997 | Coates ................. C09K 19/544 349/86 |
| 7,812,919 B2 | 10/2010 | Chien et al. |
| 8,758,645 B2 * | 6/2014 | Zheng ................ C09K 19/0275 252/299.64 |
| 9,273,248 B2 * | 3/2016 | Yang ..................... C09K 19/542 |
| 2008/0259254 A1 | 10/2008 | Kikuchi et al. |
| 2009/0290078 A1 | 11/2009 | Yang et al. |
| 2011/0007260 A1 | 1/2011 | Chien et al. |
| 2012/0235088 A1 | 9/2012 | Kilickiran et al. |
| 2013/0083283 A1 | 4/2013 | Chen et al. |
| 2013/0153822 A1 | 6/2013 | Zheng et al. |
| 2014/0111759 A1 | 4/2014 | Yang et al. |

FOREIGN PATENT DOCUMENTS

| CN | 101449203 A | 6/2009 |
| CN | 100543111 C | 9/2009 |
| CN | 101354459 B | 4/2011 |
| CN | 102517040 A | 6/2012 |
| CN | 102652167 A | 8/2012 |
| CN | 102952551 A | 3/2013 |
| EP | 1743931 B1 | 8/2011 |
| EP | 2574654 A2 | 4/2013 |
| JP | 2003327966 A | 11/2003 |
| JP | 2006348227 A | 12/2006 |
| WO | 2007122409 A1 | 11/2007 |

OTHER PUBLICATIONS

Chen, K-M., et al., "Hysteresis Effects in Blue-Phase Liquid Crystals," Journal of Display Technology, vol. 6, No. 8, pp. 318-322 (Aug. 2010).
International Search Report and Written Opinion for International Application No. PCT/CN2013/074924 dated Feb. 13, 2014.
Yabu, S., et al., "Dual frequency operation of a blue phase liquid crystal," Optical Materials Express, vol. 1, No. 8, pp. 1577-1584 (Dec. 1, 2011).

* cited by examiner

Primary Examiner — Geraldina Visconti

(57) ABSTRACT

A dual frequency liquid crystal may be stabilized in the blue phase by a polymer matrix to provide an improved blue phase temperature range having a magnitude of at least about 65° C. Polymer-stabilized, blue phase dual frequency liquid crystal compositions and methods for producing polymer-stabilized, blue phase dual frequency liquid crystals are disclosed.

16 Claims, 1 Drawing Sheet

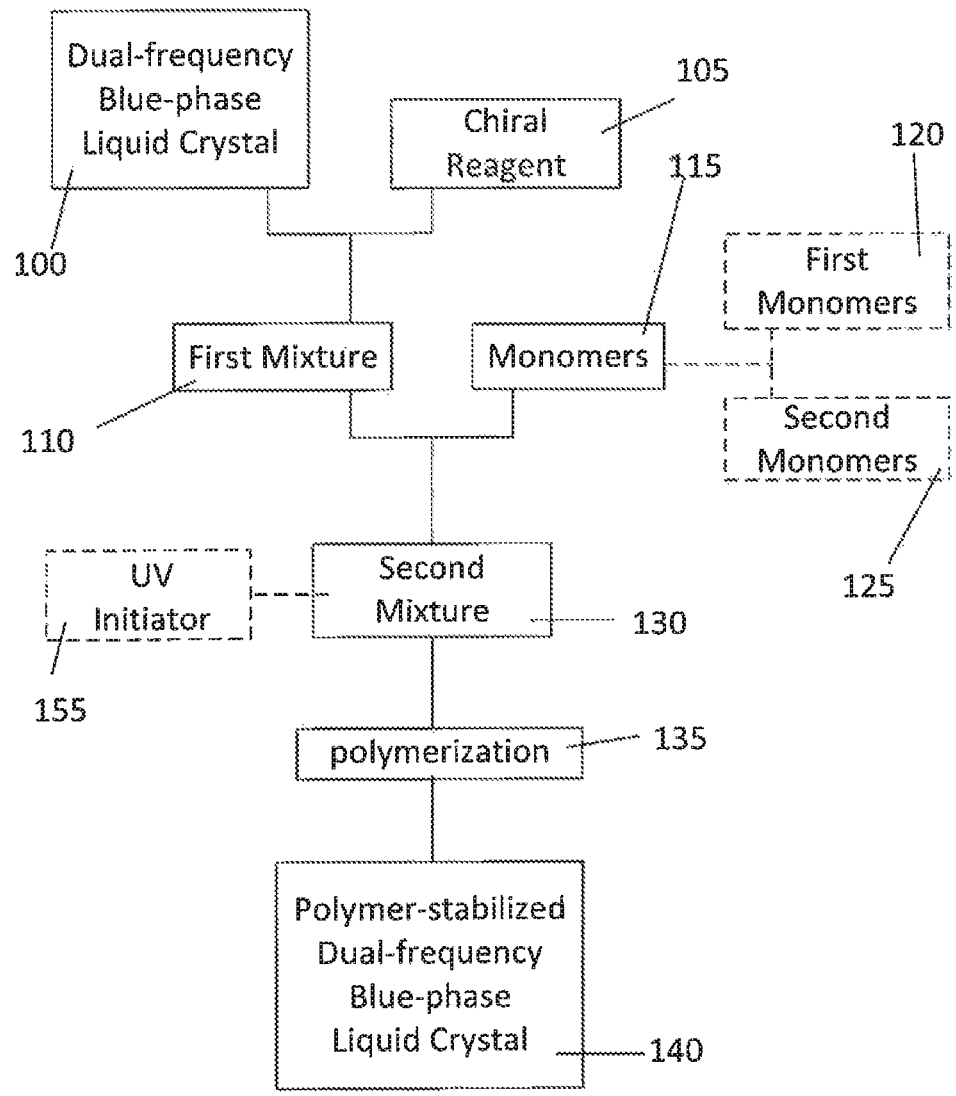

POLYMER-STABILIZED DUAL FREQUENCY BLUE PHASE LIQUID CRYSTALS

CLAIM OF PRIORITY

This application is a U.S. national stage filing under 35 U.S.C. § 371 of International Application No. PCT/CN2013/074924 filed on Apr. 28, 2013 entitled "POLYMER-STABILIZED DUAL FREQUENCY BLUE PHASE LIQUID CRYSTALS," which is incorporated herein by reference in its entirety.

BACKGROUND

Liquid crystals (LCs) are matter in a state that has properties between those of conventional liquid and those of solid crystal. In a liquid crystal, the molecules may orient themselves in a variety of ways, some of which are described herein. The liquid crystals may exist in a nematic phase over a specific temperature range. In the nematic phase, the rod-shaped molecules have no positional order, but self-align in a long-range directional order with their longitudinal axes approximately in parallel to one another. For some liquid crystals, the molecules may take on a chiral orientation order in the nematic phase. At cooler temperatures, the molecules may form a conventional solidified crystal. At higher temperatures, the liquid crystals may exist in an isotropic phase, wherein the molecules have little to no long-range order.

For some liquid crystals, there exists a blue phase between the chiral nematic phase and the isotropic phase. Liquid crystals in the blue phase have a regular three-dimensional cubic structure of double-twisted cylinders with lattice periods of several hundred nanometers, and thus they exhibit selective Bragg reflections in the wavelength range of visible light that corresponds to the cubic structure.

A liquid crystalline blue phase is an optically isotropic phase which, upon application of an electric field, and based on the Kerr effect, becomes birefringent, and due to the refractive index distribution of the liquid crystal under the electric field, turns into an optically anisotropic phase. The blue phase of the liquid crystalline material is unlike other liquid crystal phases which typically switch from one anisotropic phase to another. If the liquid crystalline material in the blue phase is brought between two crossed polarizers, the transmittance increases with an increase in the voltage application. This operation requires application of a considerable voltage as the voltage is required to induce the birefringence which itself is highly dependent on the Kerr constant of the liquid crystal material and also on the strength of the electric field generated by the voltage.

Blue phases of liquid crystals are of interest for several applications, including fast light modulators and tunable photonic crystals. Blue phase liquid crystals may provide improvements in LCD screens, optical gratings, variable optical attenuators, photonic crystal lasers, and beam steering devices. However, there remain several drawbacks associated with the blue phase liquid crystal materials. Some of the drawbacks include the high operating voltage required to switch the blue phase from a dark to a bright state, relatively low transmittance, long relaxation times, and narrow usable temperature ranges over which the blue phase is stable.

Dual-frequency liquid crystals allow for faster response times, however, for combined blue phase dual frequency liquid crystals, the other issues still remain. Blue phase dual frequency liquid crystal compositions have a very narrow blue phase stabilization range. This is due primarily from the defects which inevitably form in the three-dimensional crystal lattice during molecular self-assembly of the double twisted spiral columns. The presence of the defects leads to instability of the whole system, and temperature ranges over which the blue phase is stable are generally less than about 12° C., and exist at temperatures above normal ambient temperatures.

SUMMARY

Dual-frequency liquid crystals having a blue phase may be stabilized in their blue-phase by inclusion of a polymer in the liquid crystal matrix. Small monomer molecules may be polymerized in the defects to fill in the defects and stabilize the liquid crystal. As a result, the blue phase temperature range is broadened and encompasses commercially relevant temperatures, such as ambient room temperatures.

In an embodiment, a blue phase dual frequency liquid crystal composition may comprise a dual frequency liquid crystal capable of forming a blue phase, and at least one chiral reagent, in a polymer matrix, wherein the composition may have a magnitude of the blue phase temperature range of at least about 65° C.

In an embodiment, a method of making a blue phase dual frequency liquid crystal composition may comprise combining a plurality of monomers, a dual frequency liquid crystal capable of forming a blue phase, and at least one chiral reagent to form a mixture. The method may further comprise stabilizing the dual frequency liquid crystal in the blue phase, and polymerizing the plurality of monomers to form a polymer matrix at least around molecules of the dual frequency liquid crystal and the at least one chiral reagent to stabilize the dual frequency liquid crystal in the blue phase.

In an embodiment, a blue phase dual frequency liquid crystal composition may be prepared by a method that comprises combining at least one first monomer, at least one second monomer, a dual frequency liquid crystal capable of forming a blue phase, at least one chiral reagent and at least one UV initiator to form a mixture, stabilizing the dual frequency liquid crystal in the blue phase, and irradiating the mixture with UV light to polymerize the at least one first monomer and the at least one second monomer to form a polymer matrix at least around molecules of the dual frequency liquid crystal and the at least one chiral reagent to stabilize the dual frequency liquid crystal in the blue phase.

In an embodiment, a device may comprise a dual frequency blue phase liquid crystal composition. The dual frequency blue phase liquid crystal composition may comprise a dual frequency liquid crystal capable of forming a blue phase, and at least one chiral reagent, in a polymer matrix. The composition may have a magnitude of the blue phase temperature range of at least about 65° C.

BRIEF DESCRIPTION OF THE FIGURES

FIG. 1 depicts a flow diagram for an illustrative method of stabilizing dual frequency liquid crystals in the blue phase according to the embodiments disclosed.

DETAILED DESCRIPTION

In general, a dual frequency liquid crystal refers to a liquid crystal material having different dielectric anisotropy depending on the frequency of the electric field applied to the liquid crystal. Such dual frequency liquid crystals may be driven rapidly from one optical state to another optical state, and as such, may have applications in various types of optical and/or display devices.

Described herein are blue phase dual frequency liquid crystal compositions that can be stable over broad temperature ranges, and methods of making such compositions. The compositions described herein may provide the advantages of dual frequency liquid crystals, such as fast response times, as well as the advantages of blue phase liquid crystals, such as enhanced contrast ratio, wider viewing angles, and unobvious color transition. In addition, such compositions may exist and be usable at low temperatures, and may also be stable over broader temperature ranges.

Polymer-stabilized, dual frequency blue phase liquid crystals may be advantageous for use in display devices such as, for example, an electronic book reader, a portable game console, a mobile device screen, a computer screen, a television screen, an advertisement screen, a remote control, an information display, an e-signage, a non-flexible display, a flexible display, or any combination thereof. Other uses of such compositions may include photonic devices such as, for example, optical waveguides, optical beam scanners, computer-generated holograms, diffraction gratings, beam steering devices, variable optical attenuators, photonic crystal lasers and the like.

A blue phase dual frequency liquid crystal composition may comprise a dual frequency liquid crystal capable of forming a blue phase, and at least one chiral reagent, in a polymer matrix. The polymer matrix may increase the stability of the dual frequency liquid crystal in the blue phase so that the composition may have a magnitude of the blue phase temperature range of at least about 65° C. In various embodiments, the blue phase may be stable over a temperature range of about 65° C., about 70° C., about 75° C., about 80° C., about 85° C., about 90° C., about 95° C., about 100° C., about 105° C., about 110° C. or any value or range between any two of these values. The value of the blue phase temperature range can be calculated by taking the upper blue phase temperature limit and subtracting the lower blue phase temperature limit. For example, if the upper blue phase temperature limit is 40° C., and the lower blue phase temperature limit is −35° C., then the magnitude of the blue phase temperature range is 75° C. The magnitude of the blue phase temperature range in the absence of the polymer matrix is smaller than in the presence of the polymer matrix.

In some embodiments, the lower blue phase temperature limit of the composition or polymer-stabilized dual frequency liquid crystals, may be about −50° C., about −45° C., about −40° C., about −35° C., about −30° C., about −25° C., about −20° C., about −15° C., or any value between any two of these values. In some embodiments, the upper blue phase temperature limit may be about 30° C., about 35° C., about 40° C., about 45° C., about 50° C., about 55° C., about 60° C., or any value between any two of these values. Some specific examples of temperature ranges over which the blue phase is stable may include about −50° C. to about 30° C., about −50° C. to about 35° C., about −50° C. to about 40° C., about −50° C. to about 45° C., about −50° C. to about 50° C., about −50° C. to about 55° C., about −50° C. to about 60° C., about −40° C. to about 30° C., about −40° C. to about 35° C., about −40° C. to about 45° C., about −40° C. to about 50° C., about −40° C. to about 55° C., about −40° C. to about 60° C., about −30° C. to about 35° C., about −30° C. to about 40° C., about −30° C. to about 45° C., about −30° C. to about 50° C., about −30° C. to about 55° C., about −30° C. to about 60° C., about −20° C. to about 45° C., about −20° C. to about 50° C., about −20° C. to about 55° C., about −20° C. to about 60° C., or any range or combination of ranges between any of the upper and lower blue phase temperature limits.

With lower blue phase temperature limits ranging from −50° C. to about −15° C., and upper blue phase temperature limits ranging from about 30° C. to about 60° C., the lowest temperature range extends from about −50° C. to about 30° C., centered at about −10° C. In addition, the highest temperature range extends from about −15° C. to about 60° C., centered at about 22-23° C. Polymer-stabilized, dual frequency blue phase liquid crystals may therefore be formed with ranges that are centered at temperatures from about −10° C. to about 23° C. Some specific examples of central temperatures around which the blue phase temperature range may be formed include approximately any one of −10° C., −9° C., −8° C., −7° C., −6° C., −5° C., −4° C., −3° C., −2° C., −1° C., 0° C., 1° C., 2° C., 3° C., 4° C., 5° C., 6° C., 7° C., 8° C., 9° C., 10° C., 11° C., 12° C., 13° C., 14° C., 15° C., 16° C., 17° C., 18° C., 19° C., 20° C., 21° C., 22° C., and 23° C., and any incremental temperature between any of the listed values.

The composition may comprise any dual frequency liquid crystal that is capable of forming a blue phase. In some embodiments, the dual frequency liquid crystal may be, for example, MLC-2048, MDA-00-3969, and MDA-00-1132.

The composition may further include at least one chiral reagent. While it may be possible that essentially any chiral reagent may be used, the chiral reagent may be, for example, CB15, R1011 (ZLI-4572), S1011 (ZLI-4571), CM-9209F, R811, CE2, CE, and the like, or any combination thereof.

In various embodiments, the dual frequency liquid crystal and the at least one chiral reagent may be present in a molar ratio of about 1:2 to about 3:1. Some specific examples of molar ratios may include about 1:1 to about 3:1, about 3:2 to about 3:1, about 2:1 to about 3:1, about 5:2 to about 3:1, or any range or combination of ranges between any of these molar ratios. The molar ratio of the dual frequency liquid crystal to the at least one chiral reagent may depend on the particular dual frequency liquid crystal and the particular chiral reagents chosen, and may be optimized to achieve maximum optical contrast for the switching modes of the liquid crystal. In an embodiment, wherein the dual frequency liquid crystal is MLC2048 and the chiral reagent is R811, the above molar ratios of about 1:2 to about 3:1 for MLC2048 to R811, would provide weight ratios of about 4:1 to about 1:1.

In some embodiments, the composition may have about 50 wt % to about 80 wt % of the dual-frequency liquid crystal, and about 5 wt. % to about 40 wt. % of the at least one chiral reagent. As specific examples, the amount of dual-frequency liquid crystal in the composition may be about 50 wt %, 55 wt %, 60 wt %, 65 wt %, 70 wt %, 75 wt %, 80 wt %, or any value between any of the listed values. In additional specific examples, the amount of the at least one chiral reagent in the composition may be about 5 wt %, 10 wt %, 15 wt %, 20 wt %, 25 wt %, 30 wt %, 35 wt %, 40 wt %, or any value between any of the listed values.

A three-dimensional crystal lattice formed by molecules of a liquid crystal may have interstitial defects. The defects may cause instability in the liquid crystal system, allowing the molecular constituents some freedom of movement. Filling the defects in the three-dimensional crystal lattice of the dual frequency liquid crystal may improve the stability of the liquid crystal. Thus, it may be expected that suitable molecules or polymers chosen to fit into and occupy the defect sites in the crystal lattice of the liquid crystal when in its blue phase may stabilize the blue phase of the liquid crystal.

Polymers may be used to stabilize dual frequency liquid crystals in the blue phase. The polymers may form a polymer matrix at least around molecules of the dual frequency liquid crystal and the at least one chiral reagent to stabilize the dual frequency liquid crystal in the blue phase. In some embodiments, the polymer matrix may be at least be interstitially disposed among the at least one chiral reagent and molecules of the dual frequency liquid crystal to suppress realignment of the molecules of the dual frequency liquid crystal from the blue phase. The polymer may, therefore, be considered to 'hold' the molecules in the blue phase orientation under conditions in which they would re-align if the polymer matrix was not present. The polymer matrix may be present in various embodiments of the blue phase dual frequency liquid crystal composition at about 5 wt. % to about 15 wt. %. As specific examples, the polymer in the composition may be about 5 wt %, about 6 wt %, about 7 wt %, about 8 wt %, about 9 wt %, about 10 wt %, about 11 wt %, about 12 wt %, about 13 wt %, about 14 wt % or about 15 wt %.

The polymer may be formed in the liquid crystal lattice by introducing monomers into the liquid crystal lattice so that the monomers can infiltrate the interstitial spaces, and polymerizing the monomers to form the polymer matrix. As an example, the monomers may have at least one photopolymerizable functional group, such as a double bond (—C=C). The photopolymerizable functional group may be an ultraviolet polymerizable group, for example. After combining the monomers, the mixture may be irradiated with ultraviolet light to polymerize the monomers.

In an embodiment, the composition may comprise a polymer matrix formed from a plurality of monomers. The plurality of monomers may comprise at least one first monomer and at least one second monomer which may be different from the first monomer. The first and second monomers may have one or more photopolymerizable functional groups, such as double bonds (—C=C). The photopolymerizable functional group may be an ultraviolet polymerizable group. In various embodiments, the first monomers and the second monomers may independently be, for example, acrylate monomers, methacrylate monomers, or any one of the monomers 1,4-Bis-[4-(3-acryloyloxypropyloxy)benzoyloxy]-2-methylbenzene (commonly referred to as RM257), hexanedioldiacrylate (HDDA), tripropylene glycol diacrylate (TPGDA), 2-ethylhexyl acrylate (2-EHA), trimethylolpropane triacrylate (TMPTA), and the like, or any combination thereof. In one embodiment, the first monomer may be RM257 and the second monomer may be 2-EHA.

In various embodiments, the at least one first monomer and the at least one second monomer may be incorporated in the polymer matrix in a molar ratio of about 3:1 to about 1:3. In some embodiments, the at least one first monomer and the at least one second monomer are present in a molar ratio of about 1:3, about 1:2.5, about 1:2, about 1:1.75, about 1:1.5, about 1:1.25, about 1:1, about 1.25:1, about 1.5:1, about 1.75:1, about 2:1, about 2.5:1, about 3:1, or any ratio or a range of ratios between any two of these values. In an embodiment, wherein the monomers may be RM257 (588 g/mol) and 2-EHA (144 g/mol), the molar ratios of about 3:1 to about 1:3 would provide weight ratios of about 1764/144 (12.25:1) to about 588/432 (1.36:1).

In embodiments in which the first monomer and second monomer both have ultraviolet polymerizable functional groups, the composition may additionally include at least one photoinitiator. In various embodiments, the photoinitiator may be a UV initiator capable of initiating photopolymerization on exposure to ultraviolet (UV) light. In some embodiments, the UV initiator may be present in the composition at about 0.25 wt. % to about 2 wt %. As specific examples, the amount of UV initiator in the composition may be about 0.25 wt %, 0.5 wt %, 0.75 wt %, 1 wt %, 1.25 wt %, 1.5 wt %, 1.75 wt %, 2 wt %, or any percent between any of the listed values.

Some examples of UV initiators may include any one of the initiators sold under the name of Irgacure®. These may include, for example, Irgacure® 369, Irgacure® 379, Irgacure® 651, Irgacure® 819, and the like, or any combination thereof. The choice of the particular UV initiator and the amount present in the composition may be dependent on the particular monomers used for making the polymer matrix to be used in the composition.

In some embodiments, the UV light may have a wavelength of about 100 nanometers (nm) to about 400 nm. The polymerization may be carried out by irradiating with a UV intensity of generally any suitable intensity, for example, about 5 mW/cm$^2$ to about 10 mW/cm$^2$. The extent of polymerization may also be controlled by varying the length of time, wherein longer exposures will provide more complete polymerization.

The composition, in various embodiments, exhibits two switching modes (amplitude and phase modulation). The amplitude switching mode may demonstrate inversion at a lower frequency for higher but non-linear amplification. In some embodiments, the electro-optic switching response time may be about 10 microseconds (μs) to about 100 μs. In the phase switching mode, phase modulation may be at a higher frequency with quicker and linear modulation. As such, the wide temperature range over which the blue phase of the composition is stable and the fast switching response times render the composition usable for a wide range applications including, but not limited to, amplitude modulators, light switches, phase-only spatial light modulators, beam deflectors, and flat panel displays.

As depicted in FIG. 1, a method of making a polymer-stabilized, blue phase dual frequency liquid crystal composition may include forming a mixture 130 of a plurality of monomers 115, a dual frequency liquid crystal capable of forming a blue phase 100, and at least one chiral reagent 105. The plurality of monomers 115 may comprise at least one first monomer 120 and at least one second monomer 125. If the dual frequency liquid crystal is not in its blue phase in the mixture, the temperature of the mixture may be altered to cause the dual frequency liquid crystal to attain its blue phase. The dual frequency liquid crystal may be stabilized in its blue phase, for example, by maintaining the temperature in a range for the blue phase to exist, and, in a polymerization step 135, the plurality of monomers may form a polymer matrix at least around molecules of the dual frequency liquid crystal and the at least one chiral reagent to stabilize the dual frequency liquid crystal in the blue phase 140.

The plurality of monomers 115 may be heated to a molten (liquefied) state before adding to a mixture 110 of the dual frequency liquid crystal 100 and the at least one chiral reagent 105. In this liquefied state, the monomers may be substantially or completely homogeneously mixed into the dual frequency liquid crystal and the at least one chiral reagent to form the second mixture 130. The mixture 130 may be stirred with heating and may be heated to a temperature at which the dual frequency liquid crystal is in its blue phase. If the minimum and maximum temperatures for the blue phase are known, a temperature for the mixture may be chosen which falls between the minimum and maximum values.

The upper blue phase temperature limit (transition between blue phase and isotropic phase), and lower blue phase temperature limit (transition between blue phase and nematic phase), and magnitude of the blue phase temperature range (lower temperature to upper temperature) of a material can be determined experimentally if they are not already known. The temperature of the mixture 130 may be increased or decreased slowly while observing the mixture with a polarizing microscope to visually distinguish the temperature at which a phase change occurs. In various embodiments, possibly depending on the accuracy desired, the temperature of the mixture 130 may be increased or decreased at a rate of 0.1° C./min to about 1° C./minute. In some embodiments, the temperature may be increased or decreased at a rate of about 0.2° C./minute, about 0.4° C./minute, about 0.5° C./minute, about 0.7° C./minute, about 0.9° C./minute, or any rate or combination or rates between any two of these values. Slower rate changes will allow for more accurate determination of the phase change temperatures.

The upper and lower temperatures at which the phase transition from the blue phase occurs may be noted and a stabilization temperature may be chosen between the two values. The difference between the upper temperature and lower temperature is typically relatively small prior to polymerization, and larger after polymerization. When the mixture 130 has reached the desired stabilization temperature, the polymerization 135 may be initiated. The magnitude of the blue phase temperature range (prior to polymer stabilization) may be relatively small, for example, about 20° C. to about 40° C. Some specific examples of the magnitude of the blue phase temperature range (prior to polymer stabilization) may include about 25° C. to about 40° C., about 30° C. to about 40° C., about 20° C. to about 30° C., about 20° C. to about 35° C., about 25° C. to about 35° C., or any range or combination of ranges between any two of these ranges. For various embodiments, and depending on the blue phase temperature range (prior to polymer stabilization), the polymerization 135 may be performed at a temperature of about 22° C., about 24° C., about 26° C., about 28° C., about 30° C., about 32° C., about 34° C., about 36° C., about 38° C., or any temperature between any of the listed values.

For embodiments in which the polymer matrix is formed from two different first and second monomers (120, 125), the different monomers optionally may first be mixed together with heating to provide an essentially homogeneous, molten, monomer mixture 115. The molten monomer mixture 115 may then be mixed with the mixture 110 of the chiral reagent and the dual frequency liquid crystal.

In embodiments in which the first and second monomers (120, 125), both may have the same or different ultraviolet polymerizable functional groups, a UV initiator 155 may be added to the mixture. The polymerization may then be done by irradiating the stabilized dual frequency liquid crystals (in their blue phase) with UV radiation.

The method for making the polymer-stabilized, blue phase dual frequency liquid crystal may use any of the previously mentioned components and/or combinations of components, in any of the previously mentioned ratios and percentages to produce a resultant composition having a magnitude of the blue phase temperature range of at least about 65° C. In some embodiments, the magnitude of the blue phase temperature range may be at least about 80° C.

The choice of the dual frequency liquid crystal 100 and the chiral reagent 105 may depend on the particular application for which the resulting composition may be used. In general, a chiral reagent may be used to shift the base response of the dual frequency liquid crystal, for example, to provide a darker black.

In some embodiments, the UV light used to initiate the polymerization 135 may have a wavelength of about 100 nanometers (nm) to about 400 nm. The UV light source may include, for example, a black light, a fluorescent lamp, a gas-discharge lamp, UV LEDs, UV lasers, or any combination thereof. In various embodiments, the UV intensity may be about 5 mW/cm$^2$ to about 10 mW/cm$^2$. The particular intensity and source used may depend on factors such as, for example, the monomers used, the UV initiator, the application in which the composition is to be used, and so forth.

In further embodiments, the blue phase dual frequency liquid crystal composition may be prepared by a method including combining a first monomer 120, a second monomer 125, a dual frequency liquid crystal capable of forming a blue phase 100, at least one chiral reagent 105 and at least one UV initiator 155 to form a mixture 130; stabilizing the dual frequency liquid crystal in the blue phase; and irradiating the mixture with UV light 135 to form a polymer matrix at least around molecules of the dual frequency liquid crystal and the at least one chiral reagent to stabilize the dual frequency liquid crystal in the blue phase 140.

EXAMPLES

Preparing a Monomer Mixture

For the following examples, a monomer mixture was prepared by weighing about 39.7 mg of 2-EHA and about 79.4 mg of RM257 on an analytical balance. The monomers were placed in a vial, heated until molten, and stirred with a magnetic stirrer to evenly mix the monomers. The ratio by weight of RM257 to 2-EHA was about 2:1, or alternatively, about 66.6 wt % RM257 and 33.3 wt % 2-EHA. Alternatively, 79.4 mg RM257 is about 0.000135 mol (0.0794 g/588 g/mol), and 39.7 mg 2-EHA is about 0.000276 mol (0.0397 g/144 g/mol) corresponding to a molar ratio of RM257 to 2-EHA of about 1:2.

Example 1

Preparation of Stabilized Blue Phase Composition Using 9 wt % Polymer

About 56.3 mg of a dual frequency liquid crystal MLC2048, and 30.4 mg of a chiral reagent R811 were weighed out on an analytical balance, and added to a vial. There was about 65 wt. % liquid crystal and 35 wt. % chiral reagent, which is approximately is a 1.85:1 weight ratio, in this initial mixture. About 8.6 mg of the monomer mixture and about 0.5 mg of an UV initiator were added to the vial. The approximate weight percentages of the components in the resulting combined mixture were about 58.8 wt % liquid crystal, about 31.7 wt % chiral reagent, about 9.0 wt % polymer (about 6 wt % RM257, about 3 wt % 2-EHA) and about 0.5 wt % UV initiator.

The components in the resulting combined mixture were stirred and mixed evenly by a magnetic stirrer under heating conditions. The mixture was transferred into a liquid crystal box by means of capillary action. The box was heated and cooled to determine a blue phase temperature range of the dual frequency liquid crystal prior to polymerization. The temperature was increased and decreased slowly at a rate of about 0.5° C./minute. The blue phase transition was observed by viewing with a polarizing microscope. The blue phase temperature range prior to polymerization was measured to be from a lower blue phase temperature limit of about 26° C. to an upper blue phase temperature limit of about 38° C. (giving a value of the blue phase temperature range of 12° C.). The mixture was stabilized at a temperature of about 30° C., a value inside the blue phase temperature range. Polymerization was conducted by adjusting the light intensity of a UV laser to about 5 mW/cm$^2$ and irradiating the mixture for about 6 minutes. After the completion of the irradiation, the phase transition temperature of the polymer stabilized blue phase liquid crystal was measured again using the heating and cooling process with the polarizing microscope, and the blue phase temperature range was determined to be from about an upper blue phase temperature limit of 38° C. to a lower blue phase temperature limit of less than about −35° C., corresponding to a value of the blue phase temperature range of at least about 73° C. (38° C. minus −35° C.), with a central temperature of about 1-2° C. This is a significantly greater value than the 12° C. measured before polymerization.

Example 2

Preparation Using Shortened Illumination Time

The same procedure that was used in Example 1 was duplicated with the exception that the irradiation time was shortened to about 3 minutes. After completion of the irradiation, the blue phase temperature range was measured to be from an upper blue phase temperature limit of about 38° C. to a lower blue phase temperature limit of less than about −35° C., corresponding to an overall blue phase temperature range of at least about 73° C., with a central temperature of about 1-2° C.

Example 3

Preparation Using Lengthened Illumination Time

The same procedure that was used in Example 1 was duplicated with the exception that the irradiation time was increased to about 10 minutes. After the completion of the irradiation, the blue phase temperature range was measured to be about 38° C. to less than about −35° C., corresponding to overall value of the blue phase temperature range of at least about 73° C., with a central temperature of about 1-2° C.

Examples 1-3 were conducted with a consideration of the effect of polymerization-irradiation time on the blue phase temperature range for the polymer-stabilized liquid crystals. The conducted examples indicate that there may be minimal differences in the final results with irradiation times of from about 3 to about 10 minutes.

Example 4

Preparation Using 11.9 wt % Polymer

About 68.4 mg of the dual frequency liquid crystal MLC2048, and about 36.8 mg of the chiral reagent R811 were weighed out on an analytical balance and added to a vial. This was about 65 wt. % liquid crystal and 35 wt. % chiral reagent, which was approximately a 1.85:1 weight ratio. About 14.3 mg of the monomer mixture and about 0.6 mg of an UV initiator were added to the vial. The approximate weight percentages of the components were therefore about 56.9 wt % liquid crystal, about 30.6 wt % chiral reagent, about 11.9 wt % polymer (about 8 wt % RM257, about 4 wt % 2-EHA) and about 0.5 wt % UV initiator.

The components were stirred with a magnetic stirrer with heating to homogeneously mix the components. The mixture was transferred into a liquid crystal box through capillary action. The box heated and cooled to determine a blue phase temperature range of the dual frequency liquid crystal, and the temperature was increased and decreased slowly at a rate of about 0.5° C./minute to determine the phase transition temperatures. The phase transitions were observed with a polarizing microscope, and the blue phase temperature range was measured. The blue phase temperature range prior to polymerization was observed to be from a lower blue phase temperature limit of about 24° C. to an upper blue phase temperature limit of about 34° C. (giving a value of the blue phase temperature range of 10° C.). The mixture was stabilized at a temperature of about 28° C., a value inside the blue phase temperature range, and polymerized by UV laser light. The light intensity of the laser was adjusted to about 5 mW/cm$^2$ and irradiation was conducted for about 6 minutes. After the completion of the irradiation, the phase transition temperatures of the polymer stabilized blue phase liquid crystal were determined and the range was determined to be from an upper blue phase temperature limit of about 34° C. to a lower blue phase temperature limit of less than about −35° C., which corresponds to an overall blue phase temperature range of at least about 69° C., with a central temperature of about −1° C. to about 0° C. This is a significantly greater value than the 10° C. measured before polymerization.

Example 5

Preparation Using 6.8 wt % Polymer

About 61.5 mg of the dual frequency liquid crystal, MLC2048, and about 33.2 mg of the chiral reagent R811 were weighed out on an analytical balance and added to a vial. This was about 65 wt. % liquid crystal and 35 wt. % chiral reagent, which was approximately a 1.85:1 weight ratio. About 6.9 mg of the monomer mixture and about 0.5 mg of UV initiator were added to the vial. The approximate weight percentages of the components were therefore about 60.2 wt % liquid crystal, about 32.5 wt % chiral reagent, about 6.8 wt % polymer (about 4.53 wt % RM257, about 2.27 wt % 2-EHA) and about 0.5 wt % UV initiator.

The components were mixed evenly by stirring with a magnetic stirrer with heating. The mixture was transferred into a liquid crystal box by capillary action. The box was heated and cooled to determine the blue phase temperature range of the dual frequency liquid crystal prior to polymerization, and the temperature was increased and decreased slowly at a rate of about 0.5° C./minute until the phase transitions occurred. The phase transitions were observed with a polarizing microscope, and the blue phase temperature range was measured to be from a lower blue phase temperature limit of about 35° C. to an upper blue phase temperature limit of about 45° C. (giving a value of the blue phase temperature range of 10° C.). The temperature of the mixture was stabilized at about 37° C. for polymerization, a value inside the blue phase temperature range. The light intensity of the laser was adjusted to about 5 mW/cm2 and irradiation was conducted for about 6 minutes. After the completion of the irradiation, the phase transition temperatures were measured again. The phase transition temperature range of the polymer stabilized blue phase liquid crystal was determined to be from an upper blue phase temperature limit of about 45° C. to a lower blue phase temperature limit of less than about −35° C., corresponding to overall value of the blue phase temperature range of at least about 80° C., with a central temperature of about 5° C. This is a significantly greater value than the 10° C. measured before polymerization.

Example 6

Comparison of Results of Examples

Examples 1, 4, and 5 differ in the weight percentage of polymer in the resulting composition. The following table shows that the magnitude of the blue phase temperature range with monomers prior to polymerization was essentially the same in all three Examples, but the magnitude of the blue phase temperature range decreased with increasing concentration of polymer.

| Example | Polymer wt % | Magnitude before polymerization | Magnitude after polymerization |
|---|---|---|---|
| 5 | 6.8 | 10 | 80 |
| 1 | 9.0 | 12 | 73 |
| 4 | 11.9 | 10 | 69 |

This disclosure is not limited to the particular systems, devices and methods described, as these may vary. The terminology used in the description is for the purpose of describing the particular versions or embodiments only, and is not intended to limit the scope.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A blue phase dual frequency liquid crystal composition comprising:
   a polymer matrix comprising:
      a dual frequency liquid crystal; and
      at least one chiral reagent, wherein the polymeric matrix comprises:
         a first monomer selected from the group consisting of 1,4-Bis-[4-(3-acryloyloxypropyloxy)benzoyloxy]-2-methylbenzene, 2-EHA, hexanedioldiacrylate (HDDA), trimethylolpropanetrisacrylate (TMPTA), and tripropyleneglycoldiacrylate (TPGDA), and
         a second monomer selected from the group consisting of 1,4-Bis-[4-(3-acryloyloxypropyloxy)benzoyloxy]-2-methylbenzene, 2-EHA, hexanedioldiacrylate (HDDA), trimethylolpropanetrisacrylate (TMPTA), and tripropyleneglycoldiacrylate (TPGDA), and
   wherein the polymeric matrix is present in the composition at a concentration of about 5 weight % to about 15 weight %, the dual-frequency liquid crystal is present in the composition at a concentration of about 50 weight % to about 80 weight %, and the at least one chiral reagent is present in the composition at a concentration of about 5 weight % to about 40 weight %, and
   wherein the composition has a magnitude of a blue phase temperature range of at least about 65° C.

2. The composition of claim 1, wherein the composition comprises a lower blue phase temperature limit of about −35° C. and an upper blue phase temperature limit of about 45° C.

3. The composition of claim 1, wherein the dual frequency liquid crystal and the at least one chiral reagent are present in a molar ratio of about 1:2 to about 3:1.

4. The composition of claim 1, further comprising at least one UV initiator capable of initiating polymerization between the first monomer and the second monomer.

5. The composition of claim 1, wherein the blue phase dual frequency liquid crystal composition has an electro-optic switching with a response time of about 10 microseconds (µs) to about 100 µs.

6. The composition of claim 1, wherein the polymer matrix is at least interstitially disposed among the at least one chiral reagent and molecules of the dual frequency liquid crystal to suppress realignment of the molecules of the dual frequency liquid crystal.

7. The composition of claim 1, wherein the at least one chiral reagent is present in the composition at a concentration of about 25 weight % to about 38 weight %, the dual frequency liquid crystal is present in the composition at a concentration of about 52 weight % to about 65 weight %, and the polymer matrix is present in the composition at a concentration of about 5 weight % to about 15 weight %.

8. A method of making a blue phase dual frequency liquid crystal composition, the method comprising:
   combining about 5 weight % to about 15 weight % of a plurality of monomers, 50 weight % to about 80 weight % of a dual frequency liquid crystal, and about 5 weight % to about 40 weight % of at least one chiral reagent to form a mixture; and
   polymerizing the plurality of monomers to form a polymer matrix at least around molecules of the dual frequency liquid crystal and the at least one chiral reagent to stabilize the dual frequency liquid crystal in the blue phase, wherein the plurality of monomers comprises:
      a first monomer selected from the group consisting of 1,4-Bis-[4-(3-acryloyloxypropyloxy)benzoyloxy]-2-methylbenzene, 2-EHA, hexanedioldiacrylate (HDDA), trimethylolpropanetrisacrylate (TMPTA), and tri propyleneglycoldiacrylate (TPGDA), and
      a second monomer selected from the group consisting of 1,4-Bis[4-(3-acryloyloxypropyloxy)benzoyloxy]-2-methylbenzene, 2-EHA, hexanedioldiacrylate (HDDA), trimethylolpropanetrisacrylate (TMPTA), and tripropyleneglycoldiacrylate (TPGDA).

9. The method of claim 8, wherein the polymer matrix stabilizes the dual frequency liquid crystal in the blue phase over a temperature range of at least about 65° C.

10. The method of claim 8, wherein stabilizing dual frequency liquid crystal in the blue phase comprises stabilizing at a temperature range having a lower blue phase temperature limit of about −35° C. and an upper blue phase temperature limit of about 45° C.

11. The method of claim 8, wherein:
   the plurality of monomers in the mixture further comprise at least one UV polymerizable group;
   the method further comprises combining a UV initiator with the mixture; and
   the polymerizing comprises irradiating the mixture with UV light to polymerize the plurality of monomers.

12. The method of claim 8, wherein
the method further comprises:
   combining a UV initiator with the mixture; and
   polymerizing the plurality of monomers by irradiating the mixture with UV light.

13. The method of claim 12, wherein combining the plurality of monomers comprises combining the first monomer and the second monomer at a molar ratio of about 3:1 to about 1:3.

14. The method of claim 12, wherein combining the plurality of monomers comprises combining first monomer and the at least one second monomer at a molar ratio of about 1.25:1 to about 1:1.25.

15. The method of claim 8, wherein the combining comprises combining a dual frequency liquid crystal and the at least one chiral reagent in a molar ratio of about 1:2 to about 3:1.

16. The method of claim 8, wherein polymerizing the plurality of monomers comprises polymerizing at a temperature between an upper blue phase temperature limit and a lower blue phase temperature limit of the dual frequency liquid crystal.

* * * * *